United States Patent [19]
Newhall

[11] 3,783,169
[45] Jan. 1, 1974

[54] METHOD AND APPARATUS FOR THE CONTINUOUS FLUIDIZING OF STEEL

[75] Inventor: Henry S. Newhall, Allison Park, Pa.

[73] Assignee: Koppers Company, Inc., Pittsburgh, Pa.

[22] Filed: Sept. 5, 1972

[21] Appl. No.: 286,751

[52] U.S. Cl.................. 13/10, 13/35, 266/34 R, 432/167
[51] Int. Cl............................................. F27b 3/06
[58] Field of Search............................ 13/9, 10, 35; 266/35, 39, 37, 34; 432/163, 164, 166, 167

[56] References Cited
UNITED STATES PATENTS

| | | | |
|---|---|---|---|
| 1,689,734 | 10/1928 | Levoz | 13/9 X |
| 572,312 | 12/1896 | Price | 13/9 |
| 3,201,219 | 8/1965 | Frazier et al. | 266/37 X |

*Primary Examiner*—Roy N. Envall, Jr.
*Attorney*—Sherman H. Barber et al.

[57] ABSTRACT

An electric arc furnace having a plurality of in-line electrodes are separated by baffle plates. Scrap metal or prereduced iron ore is placed in the furnace and a thick high-temperature slag covers the molten scrap or reduced ore which is melted by heat generated at the electrodes. The current passing from one electrode to another through the molten metal and slag, inasmuch as the baffles prevent short circuit taking place through the scrap metal.

8 Claims, 3 Drawing Figures

METHOD AND APPARATUS FOR THE CONTINUOUS FLUIDIZING OF STEEL

BRIEF SUMMARY OF THE INVENTION

This invention relates to steelmaking and, more particularly, to continuous steelmaking. Generally, in electric arc furnaces, scrap metal is melted in a batch process. This is also true when prereduced iron ore pellets are treated in an electric arc furnace. In both instances, a batch operation is used because finished steel products must be produced from each individual heat.

However, in accordance with the present invention, scrap metal or prereduced iron ore pellets are melted down in an electric arc furnace wherein a plurality of electrodes are separated by refractory baffles, and wherein a heavy slag resistor blanket is formed on top of the molten metal. Current flows from electrode to an adjacent electrode through the slag blanket material or through the molten metal; the refractory baffles preventing a short circuiting of current flow through the scrap metal or prereduced iron ore pellets.

For a further understanding of the invention and for features and advantages thereof, reference may be made to the following description and the drawing which illustrates a preferred embodiment of equipment in accordance with the invention which is suitable for practicing the method of the invention.

DETAILED DESCRIPTION

Figures 1, 2:
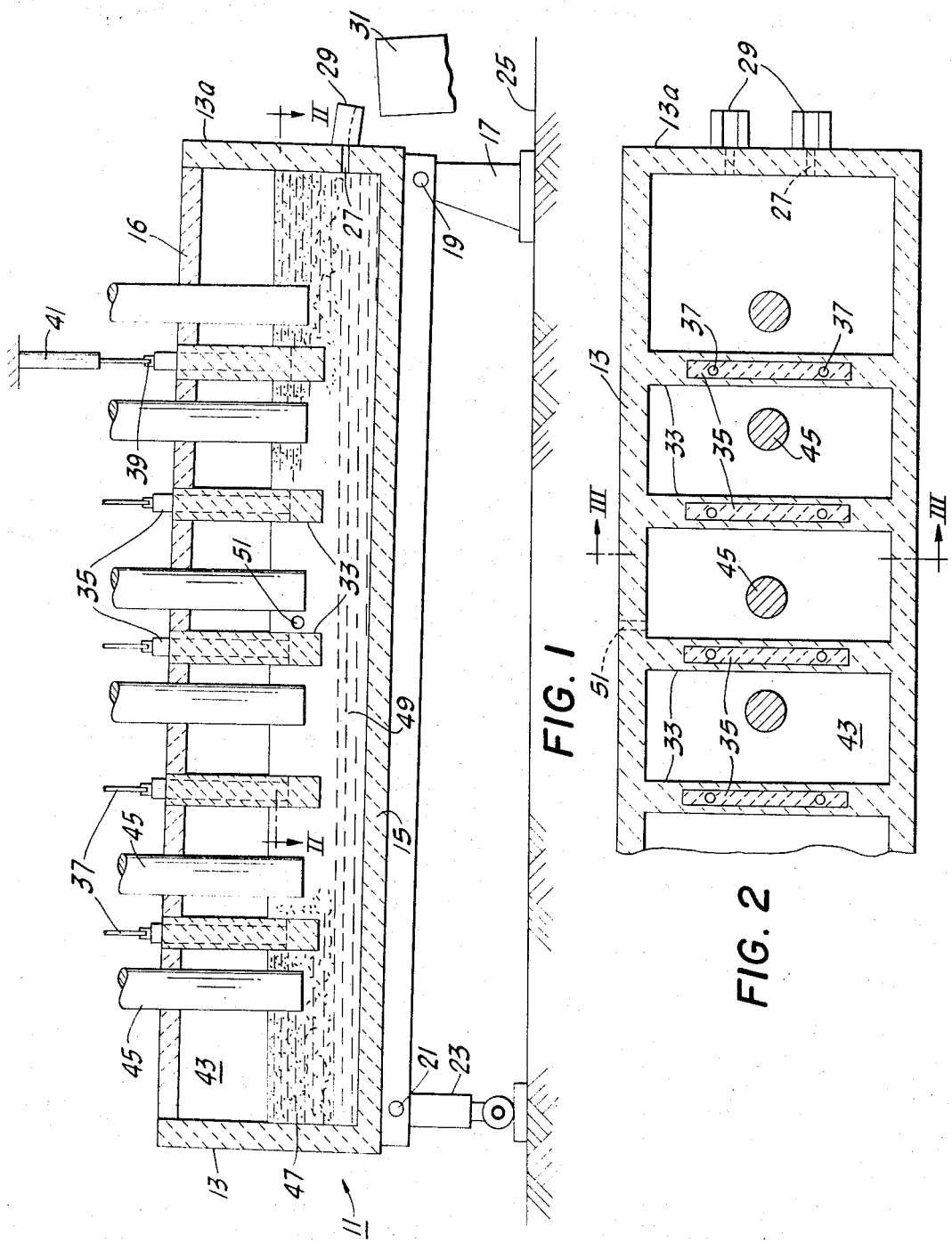
FIG. 1 is a schematic longitudinal sectional view of apparatus in accordance with the invention that is suitable for carrying into practice the method of the invention.
FIG. 2 is a view along line II—II of FIG. 1.

Referring to FIG. 1, apparatus 11 in accordance with the invention includes a rectangular, open-topped container having four vertical side walls 13, a flat bottom 15, and a flat top 16.

In the embodiment of the invention shown in FIG. 1, the apparatus 11 is supported pivotally at one end, the right-hand end, as viewed in the drawing, upon a pedestal 17 and by a pivot pin 19, and the other end is pivotally connected by a pin 21 to a fluid actuated jack 23. The pedestal 17 and jack 23 cooperate with a suitable support floor or the ground 25.

One end wall 13a of the apparatus 11 is provided with an iron notch 27 and iron runner 29 for carrying the molten metal from the apparatus 11. Molten metal that flows in the runner 29 is collected in a suitable receptacle 31.

Within the walls 13 of the apparatus 11 are a plurality of spaced-apart fixed baffles 33 that extend between opposite side walls, but that do not extend to and do not contact the bottom 15. Each baffle 33 is provided with a vertically movable consumable baffle 35. The fixed baffles 33 and the consumable baffle are made of suitable refractory material, it being understood that during operation of the apparatus, the fixed baffles 35 may be consumed, but it is desired that the fixed baffles 33 be not consumed or at least to a much smaller extent than the consumable baffles.

Each consumable baffle 35 is supported by two rods 37 that connect pivotally, as at 39, to the baffle 35 and to piston-cylinder assemblies 41. Thus, the consumable baffles 35 may be raised and lowered, as desired, relative to the fixed baffle 33 in which it is disposed.

As may be noticed from FIGS. 1 and 2, the several spaced-apart fixed baffles 33 subdivide the interior of the walled structure into a plurality of chambers 43 and in each chamber there is an electrode 45. The electrodes 45 may be either carbon or a type known in the trade as Soderberg Electrodes.

Of course, electric current from a known source of power is supplied to the electrodes 45, and they may be raised and lowered as usual in a known manner of operating electric arc furnaces.

In operation of the apparatus 11 to carry into practice the method of the invention, scrap metal or prereduced pellets are placed in each chamber 43, and material that forms a thick heavy high-temperature slag 47, such as magnesium oxide, aluminum oxide, silicon dioxide, is also introduced into each chamber. Preferably, such a slag is capable of refining metal globules as they form and sink down through the slag onto the bottom 15 or hearth of the apparatus 11 and form a pool or bath of molten metal 49.

As to the furnace or apparatus 11, it may have any other suitable shape than the rectangular shape suggested in the drawings. It may be round, square, or polygonal in horizontal cross-sectional shape.

As to the current requirements for generating heat at the electrodes, it may be single-phase, two-phase, or three-phase current. I prefer to use three-phase current, and I prefer to use six electrodes in a rectangular furnace, as shown in the drawings.

While the roof 16 is shown as a flat roof, those skilled in the art will recognize that an arched roof, or a roof having any other preferred shape may be used.

Current enters the electrodes, which are low-resistance conductors, and generates heat within the chambers as the current passes from one electrode through the slag which has a high electrical resistance to another electrode. The electrodes may be raised and lowered in conventional manner so as to control the path of the current from one electrode to an adjacent electrode. It is preferred that the current always flow through the molten slag or the molten metal, and not at all through the scrap metal lying afloat on the molten slag. As shown in FIGS. 1 and 2, a slag top hole 51 is provided in one side wall about where shown.

Heat generated by the electric current and the high-resistance slag "super heats" the slag in the path of the electrical current, and the added heat is available at the surface of the slag where it is used to melt the scrap metal lying on top of the slag. The floating scrap metal melts to droplets that gravitate through the slag to the hearth area at the bottom of the furnace.

The roof 16 of the furnace apparatus 11 may and preferably does have one or more charging ports over each chamber, and scrap metal may be charged continuously or intermittently if there is any preference or economic advantage to intermittent charging.

Tapping of molten metal may also be done continuously or intermittently, as preferred.

Figure 3:
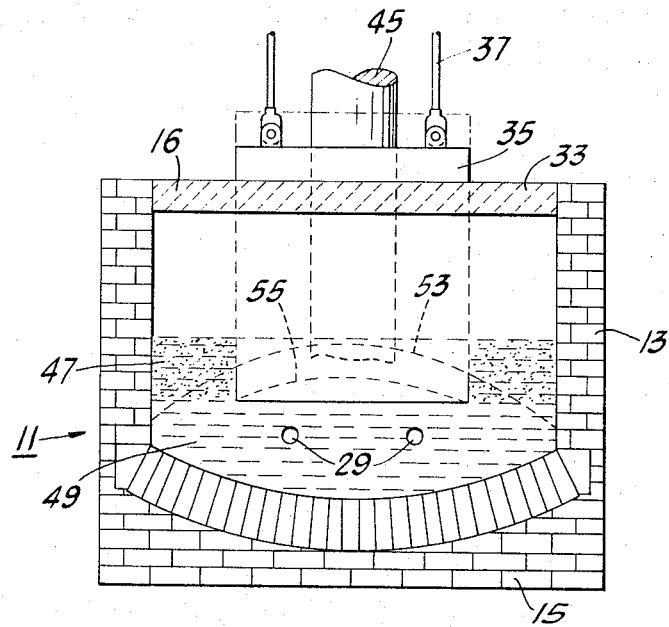
FIG. 3 is a view along line III—III of FIG. 2.

Those skilled in the art will recognize that after some hours of continuous operation, the fixed baffles 33 may be eroded away at the bottom, the bottom edge assuming a shape like that shown by the dotted outline 53 in FIG. 3. Also, the bottom edge of the consumable baffle 35 may assume a shape 55 as shown by the dotted outline in FIG. 3. One purpose of the consumable baffle 35 is to prevent current from seeking a short circuit path to scrap metal floating on the slag when the bottom edge of the fixed baffle has eroded to such an extent that its contour is like that 53 shown in FIG. 3.

The apparatus 11, as shown in FIG. 1, is tilted slightly toward the pedestal end and, in such position, continuous tapping can be effected. The quantity of metal that flows through the iron notch and runner can be regulated by varying the angle of tilt. Occasionally, the iron notch must be repaired, and it is manifestly easier to repair the iron notch when it is backed up by molten slag than by molten steel. By tilting the furnace apparatus toward the left from the position shown in FIG. 1, to a level position or even toward the left, the iron notch then will be backed up with molten slag. The slag may be frozen at the iron notch, but if not, the iron notch can be plugged and the front portion of the furnace apparatus repaired. For more extensive repairs, it may be necessary to drain some slag from the furnace by means of the slag notch in the middle of the long side wall. If continuous tapping of molten steel is required during the repair period, a second iron notch at a lower level may be provided and used temporarily.

Although the invention has been described herein with a certain degree of particularity, it is understood that the present disclosure has been made only as an example, and that the scope of the invention is defined by what is hereinafter claimed.

What is claimed is:

1. In electric furnace apparatus for continuously making steel, the improvement comprising:
   a. a furnace chamber having therein at least one wall that divides the chamber into two metal melting zones and having a passageway from which molten metal in said furnace flows;
   b. a consumable baffle associated with said wall that is movable vertically;
   c. one carbonaceous electrode disposed in each metal melting zone that is movable vertically therein;
   d. means for introducing scrap metal for melting into each zone;
   e. means for adding slag-making materials into each zone whereby a slag blanket is formed on top of molten metal resulting from the heat generated by passing electric current through said electrodes; and
   f. means for tilting said furnace so as to enhance the flowing of the molten metal therefrom.

2. The invention of claim 1 wherein:
   a. said consumable baffle is disposed in a hollow zone within its associated wall.

3. In electric furnace apparatus for continuously making steel, the improvement comprising:
   a. a furnace chamber having therein a plurality of walls that divide said chamber into a plurality of metal melting zones;
   b. a passageway for carrying molten metal out of said furnace chamber;
   c. one carbonaceous electrode in each of said metal melting zones with each electrode being movable vertically;
   d. means for passing electric current through said electrodes for generating heat in each metal melting zone;
   e. means for introducing scrap metal into each metal melting zone wherein said scrap metal is melted and forms a pool of molten metal;
   f. means for forming a slag blanket on said pool of molten metal, with said slag blanket having high electrical resistance properties;
   g. a consumable refractory baffle associated with each wall that is movable to induce current to flow from one electrode to another along a path through said slag blanket; and
   h. means for tilting said furnace to enhance the flow of molten metal therefrom through said passageway.

4. The invention of claim 3 wherein:
   a. said consumable baffle is positionable to induce current to flow along a path through said molten metal.

5. The invention of claim 3 wherein:
   a. said consumable refractory baffle is vertically movable within each wall.

6. In an electric furnace apparatus the improvement comprising:
   a. a wall within said furnace that subdivides the interior thereof into two metal melting zones with at least one electrode in each zone; and
   b. a consumable refractory baffle movable vertically within said wall in order to reduce the tendency for current to seek a short circuit path between slag floating on molten metal in one zone and an electrode in an adjacent zone as the bottom edge of said wall erodes during use.

7. The invention of claim 6 wherein:
   a. said baffle is made of refractory material and is consumable.

8. The invention of claim 6 including:
   a. a plurality of interior walls; and
   b. a consumable vertically movable baffle in each wall.

* * * * *